E. D. TILLYER.
ILLUMINATING AND PROJECTION APPARATUS.
APPLICATION FILED DEC. 4, 1919.
1,434,268.
Patented Oct. 31, 1922.
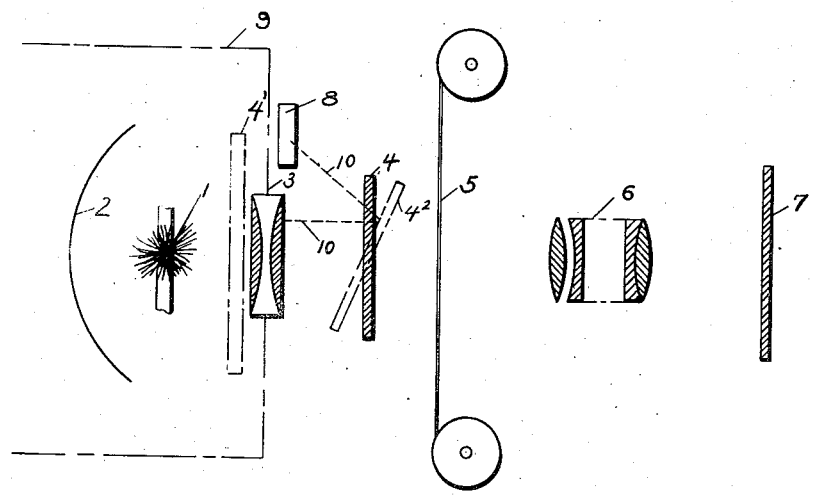
INVENTOR
EDGAR D. TILLYER
BY
H. H. Styll  H. H. Parsons
ATTORNEYS Patented Oct. 31, 1922.

1,434,268

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

ILLUMINATING AND PROJECTION APPARATUS.

Application filed December 4, 1919. Serial No. 342,437.

*To all whom it may concern:*

Be it known that I, EDGAR D. TILLYER, a citizen of the United States, residing at Southbridge, in the county of Worcester and State of Massachusetts, have invented certain new and useful Improvements in Illuminating and Projection Apparatus, of which the following is a specification.

This invention relates to illuminating and projection apparatus and has particular reference to a heat protecting screen to prevent the ignition of the film of a moving picture machine.

The principal object of this invention is to provide a heat screen of solid material which will transmit the desired illumination and prevent the transmission of the heat or other undesirable rays and of such a nature that when acted upon by the heat that it will not crack or break.

Other objects of the invention are to provide a heat screen which will transmit certain selected rays of light and prevent the transmission of certain other selected rays of light, to protect the film from the heat, to protect the condenser and projection lenses from the heat, to prevent the reflection back of the heat rays onto the lenses, and to provide means for taking up the heat turned back or retarded by the heat screen.

Other objects and advantages of the invention should be readily apparent by reference to the following specifications taken in connection with the drawings, and it will be understood that any modifications or departures may be made from the specific features disclosed within the scope of the claims without departing from the spirit of the invention, the preferred form only being shown for sake of illustration.

The figure is a diagrammatic longitudinal cross section through a moving picture machine showing the arrangement and location of parts of the invention.

It is well known that the powerful illumination required in the moving picture projection apparatus generates an intense heat. An ordinary lead pencil held in front of the condenser lens will almost immediately smoke and char. It is also well known that the films are very inflammable. If the motion of the film is stopped it will ignite almost immediately. Oftentimes it is desirable to show one view for a relatively long period, as for instance in clinical or dissecting work.

Many plans of interposing media between the light and the film have been tried, such as plain glass, mica, celluloid, and water cells, but none of them has proven efficient. Plain glass, mica and celluloid only relieve to the extent of the surface reflection; the illumination is cut down in practically the same proportion as the heat, and it will not exceed over fifteen per cent at the best. Plain glass cracks under the heat; celluloid burns up, and mica cuts down only a low per cent of the heat and cuts down the illumination at about the same rate. These substances are no better heat media than the lenses in the lens systems themselves and if increased in number cut out too much of the illumination. Water cells either of water or chemical compounds, will boil and generate bubbles which will appear on the screen and spoil the picture.

In my experiments I have found that a protective screen of glass having the property of selective retardance, either reflection or absorption of the invisible rays, and selective transmission of the visible rays, will transmit about half of the visible rays and will prevent the transmission of over ninety per cent of the heat. I have found that a glass coated with a gold film will reflect practically all of the heat rays and will transmit about half of the visible ones; also a glass having ferrous iron in its composition will absorb practically all of the heat rays and transmit about sixty per cent of the visible ones, but the heat generated is so intense that the glass will crack and break. In many instances also the condenser lenses crack and break from the heat.

I have found also that with a screen of this nature I can prevent the ultra violet rays being transmitted, which to some extent will be beneficial to the eyes of the audience. A screen made of a glass that will absorb the ultra violet rays, and plated with a film of gold, which will reflect the infrared rays will transmit a high percentage of the visible rays and prevent both the heat and ultra violet rays from being transmitted. This glass also will crack and break under the intense heat. Glasses to absorb the ultra violet rays are prepared by adding cerium salts, carbon or other metallic salts to the compound.

The cracking of the glass, lenses, or screens, has been a most difficult matter to solve. The lenses and films are high priced and disaster is common. To overcome this difficulty I have worked with glasses having a low coefficient of expansion, such as a glass containing aluminum, boric acid and silica. This glass can be heated very hot and plunged in water without cracking in the majority of cases. I have also worked with glasses having a high transmission of the heat rays, such as fused quartz, coating this glass with a gold or other metallic film to reflect the heat rays. Fused quartz also may be heated and plunged in water without cracking. High heat conductivity is also a desirable quality to prevent cracking; fused quartz possesses this to a very high degree.

I have found from my work that any glass possessing any one of these characteristics in a high degree, i. e., low expansion, high heat transmission, or high heat conductivity, will provide a heat screen almost entirely free from the danger of cracking under the action of the heat. This tendency to resist breaking I have referred to hereunder as a low tendency to fracture under temperature changes.

Referring to the drawing: The source of light is indicated at 1, the reflector at 2, the condensing lens at 3, the film at 5, the projection lenses at 6, and the shutter at 7. In the preferred form I place my protective screen 4 between the condenser lens and the film, although it could be placed between the light and the condenser lens, as indicated in dot and dash lines at 4′. While in this position the screen would protect the condenser lens, it would have to be very large in size. Also I prefer to tilt my screen, as shown in dot and dash lines at 4², when I use a screen that has the property of reflecting back the heat rays so the heat will not be reflected back onto the condenser lens but will be reflected away therefrom, as shown at 10. If desired an asbestos or other non-inflammable guard may be provided as at 8 to take care of these reflected rays and prevent injury to other parts of the apparatus. I have indicated the outlines of the lamp box in dot and dash at 9.

The characteristics of my heat screen 4 are a low coefficient of expansion or high heat transmission, or high heat conductivity; a high transmission of the illumination, or visible rays, and a selective retardance of the invisible rays, particularly the heat rays.

To obtain the low coefficient of expansion or high heat transmission, or high heat conductivity, I may use a media of fused quartz, or one high in boric acid, such as the commercial product known as pyrex glass. I have found that a screen made of this material will stand the heat without cracking. This material also has a high transmission of the illumination or visible rays. I may either reflect or absorb the heat rays. If I desire to reflect them I coat the screen with a thin film of gold; if to absorb them I introduce ferrous iron into the mixture from which the screen is made; both media have a high transmission of the visible rays. If I desire also to prevent the transmission of the ultra violet rays I introduce into the media materials having the property of absorbing the ultra violet rays, such as cerium salts, carbon or other metal salts as found in the commercial optical glasses known as Crookes and Noviol, amber, etc.

From the foregoing description it will be seen that I have provided in an apparatus of this kind a heat protecting screen of high heat resistance, high transmission of illumination, and selective retardance of the invisible rays, the heat rays in particular.

Having described my invention, I claim:

1. A heat arresting screen of glass composition having the property of transmission of a high percentage of visible light and having incorporated therein elements having the property of selective retardance of heat radiations and elements having a low coefficient of expansion whereby cracking of the screen under the influence of heat radiations is prevented.

2. A heat arresting screen of transparent glass composition having incorporated therewith a plurality of elements, certain of said elements having the property of selective retardance of invisible radiations and additional elements having the property of neutralizing the expansion of the glass base elements to prevent breakage under variable heat conditions.

3. A heat arresting screen of solid material having a low coefficient of expansion, said screen having the property of transmission of a high percentage of visible light, and a transparent metallic film on said screen having the property of retardance by reflection of invisible radiations.

4. In a device of the character described, a heat arresting screen of solid transparent media having in composition ingredients distinguishable by the fact that they impart to the glass a low tendency to fracture under temperature changes, a high transmission of visible light, and a high retardance of invisible light.

5. A heat arresting screen comprising base elements which when united produce a solid transparent media having a high transmission of visible light, an additional element having the property of slight expansion under heat to prevent cracking of the composition as an entirety under heat conditions, and an additional element having the property of retardance of heat rays whereby transmission of heat rays by the screen is prevented.

6. In a device of the character described, the combination with the light and the film, of a heat arresting screen of solid material between the light and the film, transparent as to visible light and including elements having a low coefficient of expansion, and a high retardance of the heat rays.

7. In a device of the character described, the combination with the light and the film, of a heat arresting screen of solid material between the light and film transparent as to visible light and including elements having a low coefficient of expansion, and a high retardance of invisible light.

8. In a device of the character described, the combination with the light and the film, of a heat arresting screen of solid material between the light and film transparent as to visible light and including elements having a low coefficient of expansion, and high retardance to certain selected rays of light.

9. In a device of the character described, the combination with the light and the film, of a heat arresting screen of solid material between the light and film, said screen comprising a transparent glass high in boric acid, and a metallic film thereon.

10. In a device of the character described, the combination with the light and the film, of a heat arresting screen of solid material between the light and film, having a low coefficient of expansion, a high transmission of visible light and a metallic film thereon adapted to reflect the heat rays.

11. In a device of the character described in combination with the light and the film, an inclined heat screen between the light and film adapted to reflect the heat rays and transmit the visible rays, and a non-inflammable guard interposed in the path of the reflected heat rays.

12. As an article of manufacture, a heat arresting screen of solid material comprising a transparent glass high in boric acid, and a metallic film thereon.

In testimony whereof I have affixed my signature, in presence of two witnesses.

EDGAR D. TILLYER.

Witnesses:
HARRY H. STYLL,
H. K. PARSONS.